(12) United States Patent
Sano et al.

(10) Patent No.: US 12,058,623 B2
(45) Date of Patent: Aug. 6, 2024

(54) USER EQUIPMENT AND TRANSMISSION POWER CONTROL METHOD

(71) Applicant: NTT DOCOMO, INC., Tokyo (JP)

(72) Inventors: Yousuke Sano, Tokyo (JP); Hiromasa Umeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/268,731

(22) PCT Filed: Sep. 20, 2018

(86) PCT No.: PCT/JP2018/034904
§ 371 (c)(1),
(2) Date: Feb. 16, 2021

(87) PCT Pub. No.: WO2020/059097
PCT Pub. Date: Mar. 26, 2020

(65) Prior Publication Data
US 2021/0306960 A1   Sep. 30, 2021

(51) Int. Cl.
*H04W 52/30*   (2009.01)
(52) U.S. Cl.
CPC .................................. *H04W 52/30* (2013.01)
(58) Field of Classification Search
CPC .............................................. H04W 52/00–60
See application file for complete search history.

(56) References Cited

U.S. PATENT DOCUMENTS

| | | | | |
|---|---|---|---|---|
| 6,311,070 | B1* | 10/2001 | Tong | H04W 52/367 370/318 |
| 8,145,251 | B2* | 3/2012 | Love | H04W 52/367 455/343.1 |
| 2011/0044296 | A1* | 2/2011 | Zhang | H04W 52/42 370/336 |
| 2015/0341864 | A1* | 11/2015 | Yang | H04W 72/0413 455/522 |
| 2016/0205631 | A1 | 7/2016 | Chen et al. | |
| 2017/0290020 | A1 | 10/2017 | Aiba et al. | |

(Continued)

FOREIGN PATENT DOCUMENTS

| | | |
|---|---|---|
| EP | 3843346 A1 | 6/2021 |
| JP | 2018-26629 A | 2/2018 |

(Continued)

OTHER PUBLICATIONS

International Search Report issued in Application No. PCT/JP2018/034904, mailed on Oct. 23, 2018 (5 pages).

(Continued)

*Primary Examiner* — Raymond S Dean
(74) *Attorney, Agent, or Firm* — Osha Bergman Watanabe & Burton LLP

(57) ABSTRACT

A user equipment includes a transmission unit configured to transmit a signal; and a control unit configured to determine, according to a power class, a maximum transmission power for transmitting the signal. The control unit adjusts, according to an instruction from a base station apparatus, the maximum transmission power. The instruction includes information validating or invalidating adjustment of the maximum transmission power.

4 Claims, 24 Drawing Sheets

(56) References Cited

U.S. PATENT DOCUMENTS

| 2017/0311293 | A1* | 10/2017 | Jung | H04W 76/14 |
| 2018/0323947 | A1* | 11/2018 | Brunel | H04L 5/1469 |
| 2019/0372741 | A1* | 12/2019 | Kazmi | H04W 4/70 |
| 2019/0372817 | A1* | 12/2019 | Geng | H04L 27/2621 |

FOREIGN PATENT DOCUMENTS

| JP | 2018-505600 | A | 2/2018 |
| WO | 2016/047753 | A1 | 3/2016 |
| WO | 2016/114889 | A1 | 7/2016 |
| WO | 2018/088953 | A1 | 5/2018 |

OTHER PUBLICATIONS

Written Opinion issued in International Application No. PCT/JP2018/034904, mailed on Oct. 23, 2018 (4 pages).

3GPP TS 38.101-1 V15.2.0, Release 15; "3rd Generation Partnership Project; Technical Specification Group Radio Access Network; NR; User Equipment (UE) radio transmission and reception; Part 1: Range 1 Standalone;" Jun. 2018; Sophia Antipolis Valbonne, France (126 pages).

3GPP TS 36.304 V15.0.0, Release 15; "3rd Generation Partnership Project; Technical Specification Group Radio Access Network; Evolved Universal Terrestrial Radio Access (E-UTRA); User Equipment (UE) procedures in idle mode;" Jun. 2018; Sophia Antipolis Valbonne, France (52 pages).

Extended European Search Report issued in counterpart European Patent Application No. 18933787.6, mailed on Apr. 12, 2022 (14 pages).

Indian Institute of Tech (M) et al.; "CR to TS 38.101-1: pi/2 BPSK"; 3GPP TSG RAN WG4 Meeting #88, R4-1811493; Gothenburg, SE; Aug. 20-24, 2018 (6 pages).

3GPP TS 38.331 V15.3.0; "3rd Generation Partnership Project; Technical Specification Group Radio Access Network; NR; Radio Resource Control (RRC) protocol specification (Release 15)"; Sep. 2018 (441 pages).

Office Action in counterpart Japanese Patent Application No. 2020-547559 issued on May 10, 2022 (6 pages).

Office Action in Chinese Patent Application No. 201880097663.6 issued on Dec. 14, 2023 (24 pages).

Office Action issued in Vietnamese Application No. 1-2021-02044; Dated Aug. 22, 2023 (4 pages).

Office Action issued in counterpart Chinese Application No. 201880097663.6, mailed May 17, 2024 (17 pages).

3GPP TS 38.508-1 V1.0.0, Release 15; "3rd Generation Partnership Project; Technical Specification Group Radio Access Network; 5GS; User Equipment (UE) conformance specification; Part 1: Common test environment"; May 2018 (137 pages).

* cited by examiner

FIG.1

| NR band | Class 1 (dBm) | Tolerance (dB) | Class 2 (dBm) | Tolerance (dB) | Class 3 (dBm) | Tolerance (dB) |
|---|---|---|---|---|---|---|
| n1 | | | | | 23 | ± 2 |
| n2 | | | | | 23 | ± 2³ |
| n8 | | | | | 23 | ± 2³ |
| n12 | | | | | 23 | ± 2³ |
| n25 | | | | | 23 | ± 2 |
| n34 | | | | | 23 | ± 2 |
| n39 | | | | | 23 | ± 2 |
| n40 | | | | | 23 | ± 2 |
| n41 | | | 26 | +2/−3³ | 23 | ± 2³ |
| n66 | | | | | 23 | ± 2 |
| n70 | | | | | 23 | ± 2 |
| n71 | | | | | 23 | +2/−2.5 |
| n77 | | | 26 | +2/−3 | 23 | +2/−3 |
| n78 | | | 26 | +2/−3 | 23 | +2/−3 |
| n79 | | | 26 | +2/−3 | 23 | +2/−3 |
| n80 | | | | | 23 | ± 2 |
| n81 | | | | | 23 | ± 2 |
| n82 | | | | | 23 | ± 2 |
| n83 | | | | | 23 | ± 2/−2.5 |
| n84 | | | | | 23 | ± 2 |
| n86 | | | | | 23 | ± 2 |

CLASS THAT CAN BE USED IN JAPAN (Class 3)

FIG.5

| Power class | Maximum transmission power | |
|---|---|---|
| | Pi/2 BPSK with spectrum shaping | Other than the left |
| 3 | 26 dBm | 23 dBm |

FIG.6

The UE is allowed to set its configured maximum output power $P_{CMAX,f,c}$ for carrier f of serving cell c in each slot. The configured maximum output power $P_{CMAX,f,c}$ is set within the following bounds:

$$P_{CMAX\_L,f,c} \leq P_{CMAX,f,c} \leq P_{CMAX\_H,f,c} \text{ with}$$

$$P_{CMAX\_L,f,c} = MIN \{P_{EMAX,c} - \Delta T_{C,c}, (P_{PowerClass} - \Delta P_{PowerClass}) - MAX(MPR_c + A-MPR_c + \Delta T_{IB,c} + \Delta T_{C,c} + \Delta T_{RxSRS}, P-MPR_c) \}$$

$$P_{CMAX\_H,f,c} = MIN \{P_{EMAX,c}, P_{PowerClass} - \Delta P_{PowerClass} \}$$

FIG.7

$$Srxlev = Q_{rxlevmeas} - (Q_{rxlevmin} + Q_{rxlevminoffset}) - Pcompensation - Qoffset_{temp}$$

FIG.8

6.2.4 Configured transmitted power

The UE is allowed to set its configured maximum output power $P_{CMAX,f,c}$ for carrier f of serving cell c in each slot. The configured maximum output power $P_{CMAX,f,c}$ is set within the following bounds:

$$P_{CMAX\_L,f,c} \leq P_{CMAX,f,c} \leq P_{CMAX\_H,f,c}$$

with $$P_{CMAX\_L,f,c} = MIN \{P_{EMAX,c} - \Delta T_{C,c}, (P_{PowerClass} - \Delta P_{PowerClass}) - MAX(MPR_c + A-MPR_c + \Delta T_{IB,c} + \Delta T_{C,c} + \Delta T_{RxSRS}, P-MPR_c)\}$$

$$P_{CMAX\_H,f,c} = MIN \{P_{EMAX,c}, P_{PowerClass} - \Delta P_{PowerClass}\}$$

where $P_{EMAX,c}$ is the value given by IE P-Max for serving cell c, defined in TS 38.331[7];

$P_{PowerClass}$ is the maximum UE power specified in Table 6.2.1-1 without taking into account the tolerance specified in the Table 6.2.1-1;

When the IE [P-Boost-BPSK] is set to 1, $P_{EMAX,c}$ is increased by +3 dB for a power class 3 capable UE operating in TDD bands n40, n77, n78, and n79 with PI/2 BPSK modulation and 40% or less slots in radio frame are used for UL transmission when $P_{EMAX,c} \geq 20$ dBm.

When the IE [P-Boost-BPSK] is set to 1, $\Delta P_{PowerClass} = -3$ dB for a power class 3 capable UE operating in TDD bands n40, n77, n78, and n79 with PI/2 BPSK modulation and 40% or less slots in radio frame are used for UL transmission.

FIG.9A

*FrequencyInfoUL*

The IE *FrequencyInfoUL* provides basic parameters of an uplink carrier and transmission thereon.

FrequencyInfoUL information element

```
-- ASN1START
-- TAG-FREQUENCY-INFO-UL-START

FrequencyInfoUL ::=          SEQUENCE {
    frequencyBandList            MultiFrequencyBandListNR                              OPTIONAL,   -- Cond FDD-OrSUL
    absoluteFrequencyPointA      ARFCN-ValueNR                                         OPTIONAL,   -- Cond FDD-OrSUL
    scs-SpecificCarrierList      SEQUENCE (SIZE (1..maxSCSs)) OF SCS-SpecificCarrier,
    additionalSpectrumEmission   AdditionalSpectrumEmission                            OPTIONAL,   -- Need S
    p-Max                        P-Max                                                 OPTIONAL,   -- Need S
    frequencyShift7p5khz         ENUMERATED {true}                                     OPTIONAL,   -- Cond FDD-OrSUL-Optional
    ...
}

-- TAG-FREQUENCY-INFO-UL-STOP
-- ASN1STOP
```

FIG.9B

| FrequencyInfoUL field descriptions |
|---|
| absoluteFrequencyPointA<br>Absolute frequency of the reference resource block (Common RB 0). Its lowest subcarrier is also known as Point A. Note that the lower edge of the actual carrier is not defined by this field but rather in the scs-SpecificCarrierList. Corresponds to L1 parameter 'offset-ref-low-scs-ref-PRB' (see 38.211, section FFS_Section) |
| additionalSpectrumEmission<br>The additional spectrum emission requirements to be applied by the UE on this uplink. If the field is absent, the UE applies the value FFS_RAN4. (see FFS_section, section FFS_Section) |
| frequencyBandList<br>List of one or multiple frequency bands to which this carrier(s) belongs. Multiple values are only supported in system information but not when the FrequencyInfoDL is provided in dedicated signalling (HO or S(p)Cell addition). |
| frequencyShift7p5khz<br>Enable the NR UL transmission with a 7.5KHz shift to the LTE raster. If the field is absent, the frequency shift is disabled. |
| p-Max<br>Maximum transmit power allowed in this serving cell. The maximum transmit power that the UE may use on this serving cell may be additionally limited by p-NR-FR1 (configured for the cell group) and by p-UE-FR1 (configured total for all serving cells operationg on FR1). If absent, the UE applies the maximum power according to TS 38.101 [15]. |
| scs-SpecificCarrierList<br>A set of carriers for different subcarrier spacings (numerologies). Defined in relation to Point A. Corresponds to L1 parameter 'offset-pointA-set' (see 38.211, section FFS_Section) |

FIG.10A

ServingCellConfig

The *ServingCellConfig* IE is used to configure (add or modify) the UE with a serving cell, which may be the SpCell or an SCell of an MCG or SCG. The parameters herein are mostly UE specific but partly also cell specific (e.g. in additionally configured bandwidth parts).

*ServingCellConfig* information element

```
-- ASN1START
-- TAG-SERVING-CELL-CONFIG-START

ServingCellConfig ::=         SEQUENCE {
    tdd-UL-DL-ConfigurationDedicated    TDD-UL-DL-ConfigDedicated                              OPTIONAL,    -- Cond TDD initialDownlinkBWP                  BWP-DownlinkDedicated                                  OPTIONAL,    -- Need M
    downlinkBWP-ToReleaseList           SEQUENCE (SIZE (1..maxNrofBWPs)) OF BWP-Id             OPTIONAL,    -- Need N
    downlinkBWP-ToAddModList            SEQUENCE (SIZE (1..maxNrofBWPs)) OF BWP-Downlink       OPTIONAL,    -- Need N
    firstActiveDownlinkBWP-Id           BWP-Id                                                 OPTIONAL,    -- Cond SyncAndCellAdd
    bwp-InactivityTimer                 ENUMERATED {ms2, ms3, ms4, ms5, ms6, ms8, ms10, ms20, ms30,
                                                    ms40, ms50, ms60, ms80, ms100, ms200, ms300, ms500,
                                                    ms750, ms1280, ms1920, ms2560, spare9, spare8,
                                                    spare7, spare6, spare5, spare4, spare3, spare2, spare1 }  OPTIONAL, --Need R defaultDownlinkBWP-Id               BWP-Id                                                 OPTIONAL,    -- Need S
```

FIG.10B

(*ServingCellConfig* information element (Continued))

```
uplinkConfig                 UplinkConfig                                              OPTIONAL,     -- Need M
supplementaryUplink          UplinkConfig                                              OPTIONAL,     -- Need M pdcch-ServingCellConfig      SetupRelease { PDCCH-ServingCellConfig }                  OPTIONAL,     -- Need M
pdsch-ServingCellConfig      SetupRelease { PDSCH-ServingCellConfig }                  OPTIONAL,     -- Need M
csi-MeasConfig               SetupRelease { CSI-MeasConfig }                           OPTIONAL,     -- Need M
sCellDeactivationTimer       ENUMERATED {ms20, ms40, ms80, ms160, ms200, ms240,
                                         ms320, ms400, ms480, ms520, ms640, ms720,
                                         ms840, ms1280, spare2, spare1}   OPTIONAL,    -- Cond ServingCellWithoutPUCCH
crossCarrierSchedulingConfig CrossCarrierSchedulingConfig                              OPTIONAL,     -- Need M
tag-Id                       TAG-Id,
ue-BeamLockFunction          ENUMERATED {enabled}                                      OPTIONAL,     -- Need R
pathlossReferenceLinking     ENUMERATED {pCell, sCell}                                 OPTIONAL,     -- Cond SCellOnly
servingCellMO                MeasObjectId                                              OPTIONAL,     -- Cond MeasObject
...
}
```

FIG.10C

*(ServingCellConfig information element (Continued))*

```
UplinkConfig ::=                    SEQUENCE {
    initialUplinkBWP                BWP-UplinkDedicated                              OPTIONAL,    -- Need M
    uplinkBWP-ToReleaseList         SEQUENCE (SIZE (1..maxNrofBWPs)) OF BWP-Id       OPTIONAL,    -- Need N
    uplinkBWP-ToAddModList          SEQUENCE (SIZE (1..maxNrofBWPs)) OF BWP-Uplink   OPTIONAL,    -- Need N
    firstActiveUplinkBWP-Id         BWP-Id                                           OPTIONAL,    -- Cond SyncAndCellAdd
    pusch-ServingCellConfig         SetupRelease { PUSCH-ServingCellConfig }         OPTIONAL,    -- Need M
    carrierSwitching                SetupRelease { SRS-CarrierSwitching }            OPTIONAL,    -- Need M
    ...,
    [[ powerBoostPi2BPSK            ENUMERATED {enabled}                             OPTIONAL,    -- Need R
    ]]
}

-- TAG-SERVING-CELL-CONFIG-STOP
-- ASN1STOP
```

FIG.10D

| ServingCellConfig field descriptions |
|---|
| bwp-InactivityTimer<br>The duration in ms after which the UE falls back to the default Bandwidth Part. (see 38.321, section 5.15) The value 0.5 ms is only applicable for carriers >6 GHz. When the network releases the timer configuration, the UE stops the timer without switching to the default BWP. |
| crossCarrierSchedulingConfig<br>Indicates whether this serving cell is cross-carrier scheduled by another serving cell or whether it cross-carrier schedules another serving cell. |
| defaultDownlinkBWP-Id<br>Corresponds to L1 parameter 'default-DL-BWP'. The initial bandwidth part is referred to by BWP-Id = 0. ID of the downlink bandwidth part to be used upon expiry of the BWP inactivity timer. This field is UE specific. When the field is absent the UE uses the the initial BWP as default BWP. (see 38.211, 38.213, section 12 and 38.321, section 5.15) |
| downlinkBWP-ToAddModList<br>List of additional downlink bandwidth parts to be added or modified. (see 38.211, 38.213, section 12). |
| downlinkBWP-ToReleaseList<br>List of additional downlink bandwidth parts to be released. (see 38.211, 38.213, section 12). |
| firstActiveDownlinkBWP-Id<br>If configured for an SpCell, this field contains the ID of the DL BWP to be activated upon performing the RRC (re-)configuration. If the field is absent, the RRC (re-)configuration does not impose a BWP switch (corresponds to L1 parameter 'active-BWP-DL-PCell').<br>If configured for an SCell, this field contains the ID of the downlink bandwidth part to be used upon MAC-activation of an SCell. The initial bandwidth part is referred to by BWP-Id = 0.<br>Upon reconfigurationWithSync (PCell handover, PSCelladdition/change), the network sets the *firstActiveDownlinkBWP-Id* and *firstActiveUplinkBWP-Id* to the same value. |

FIG.10E

*(ServingCellConfig field descriptions (continued))*

| | |
|---|---|
| *initialDownlinkBWP*<br>The dedicated (UE-specific) configuration for the initial downlink bandwidth-part. | |
| *pathlossReferenceLinking*<br>Indicates whether UE shall apply as pathloss reference either the downlink of PCell or of SCell that corresponds with this uplink (see 38.213, section 7) | |
| *pdsch-ServingCellConfig*<br>PDSCH releated parameters that are not BWP-specific. | |
| *sCellDeactivationTimer*<br>SCell deactivation timer in TS 38.321 [3]. If the field is absent, the UE applies the value infinity. | |
| *servingCellMO*<br>*measObjectId* of the *MeasObjectNR* in *MeasConfig* which is associated to the serving cell. For this *MeasObjectNR*, the following relationship applies between this MeasObjectNR and *frequencyInfoDL* in *ServingCellConfigCommon* of the serving cell: if *ssbFrequency* is configured, its value is the same as like the *absoluteFrequencySSB* and if *csi-rs-ResourceConfigMobility* is configured, the value of its *subcarrierSpacing* is present in one entry of the *scs-SpecificCarrierList*, *csi-RS-CellListMobility* includes an entry corresponding to the serving cell (with *cellId* equal to *physCellId* in *ServingCellConfigCommon*) and the frequency range indicated by the *csi-rs-MeasurementBW* of the entry in *csi-RS-CellListMobility* is included in the frequency range indicated by in the entry of the *scs-SpecificCarrierList*. | |
| *tag-Id*<br>Timing Advance Group ID, as specified in TS 38.321 [3], which this cell belongs to. | |
| *ue-BeamLockFunction*<br>Enables the "UE beam lock function (UBF)", which disable changes to the UE beamforming configuration when in NR_RRC_CONNECTED. FFS: Parameter added preliminary based on RAN4 LS in R4-1711823. Decide where to place it (maybe ServingCellConfigCommon or in a BeamManagement IE??) | |

FIG.10F

| UplinkConfig field descriptions |
|---|
| carrierSwitching<br>Includes parameters for configuration of carrier based SRS switching Corresponds to L1 parameter 'SRS-CarrierSwitching' (see 38.214, section FFS_Section). |
| firstActiveUplinkBWP-Id<br>If configured for an SpCell, this field contains the ID of the UL BWP to be activated upon performing the RRC (re-)configuration. If the field is absent, the RRC (re-)configuration does not impose a BWP switch (corresponds to L1 parameter 'active-BWP-UL-Pcell').<br>If configured for an SCell, this field contains the ID of the uplink bandwidth part to be used upon MAC-activation of an SCell. The initial bandwidth part is referred to by BandwidthPartId = 0. |
| initialUplinkBWP<br>The dedicated (UE-specific) configuration for the initial uplink bandwidth-part. |
| powerBoostPi2BPSK<br>If this field is set to enabled when pi/2 BPSK is used, the maximum total transmit power to be used by the UE in this serving cell is set to the value indicated by p-Max in FrequencyInfoUL IE plus 3dB, according to TS 38.101 (Section X.Y.Z). |
| pusch-ServingCellConfig<br>PUSCH related parameters that are not BWP-specific. |
| supplementaryUplink<br>The field is optionally present if *supplementaryUplinkConfig* is configured in ServingCellConfigCommon and absent otherwise. |
| uplinkBWP-ToReleaseList<br>The additional bandwidth parts for uplink. In case of TDD uplink- and downlink BWP with the same bandwidthPartId are considered as a BWP pair and must have the same center frequency. |
| uplinkConfig<br>The field is optionally present if *uplinkConfigCommon* is configured in ServingCellConfigCommon, and absent otherwise. |

FIG.11A

PhysicalCellGroupConfig

The IE *PhysicalCellGroupConfig* is used to configure cell-group specific L1 parameters.

PhysicalCellGroupConfig information element

```
-- ASN1START
-- TAG-PHYSICALCELLGROUPCONFIG-START

PhysicalCellGroupConfig ::=         SEQUENCE {
    harq-ACK-SpatialBundlingPUCCH       ENUMERATED {true}                       OPTIONAL,   -- Need S
    harq-ACK-SpatialBundlingPUSCH       ENUMERATED {true}                       OPTIONAL,   -- Need S
    p-NR-FR1                            P-Max                                   OPTIONAL,   -- Need R
    pdsch-HARQ-ACK-Codebook             ENUMERATED {semiStatic, dynamic},
    tpc-SRS-RNTI                        RNTI-Value                              OPTIONAL,   -- Need R
    tpc-PUCCH-RNTI                      RNTI-Value                              OPTIONAL,   -- Need R
    tpc-PUSCH-RNTI                      RNTI-Value                              OPTIONAL,   -- Need R
    sp-CSI-RNTI                         RNTI-Value                              OPTIONAL,   -- Cond SP-CSI-Report
    cs-RNTI                             SetupRelease { RNTI-Value }             OPTIONAL,   -- Need M
    ...,
    [[
    mcs-C-RNTI                          RNTI-Value                              OPTIONAL    -- Need R,
    p-UE-FR1                            P-Max                                   OPTIONAL,   -- Cond MCG-Only
    ]],
    [[ powerBoostPi2BPSK                ENUMERATED {enabled}                    OPTIONAL    -- Need R
    ]]
}
```

FIG.11B

| PhysicalCellGroupConfig field descriptions |
|---|
| cs-RNTI<br>RNTI value for downlink SPS (see SPS-Config) and uplink configured grant (see ConfiguredGrantConfig). |
| harq-ACK-SpatialBundlingPUCCH<br>Enables spatial bundling of HARQ ACKs. It is configured per cell group (i.e. for all the cells within the cell group) for PUCCH reporting of HARQ-ACK. It is only applicable when more than 4 layers are possible to schedule. When the fidId is absent, the spatial bundling is disabled.<br>Corresponds to L1 parameter 'HARQ-ACK-spatial-bundling' (see 38.213, section FFS_Section) |
| harq-ACK-SpatialBundlingPUSCH<br>Enables spatial bundling of HARQ ACKs. It is configured per cell group (i.e. for all the cells within the cell group) for PUSCH reporting of HARQ-ACK. It is only applicable when more than 4 layers are possible to schedule. When the fidId is absent, the spatial bundling is disabled.<br>Corresponds to L1 parameter 'HARQ-ACK-spatial-bundling' (see 38.213, section FFS_Section) |
| mcs-C-RNTI<br>RNTI to indicate use of qam64LowSE for grant-based transmissions. When the MCS-C-RNTI is configured, RNTI scrambling of DCI CRC is used to choose the corresponding MCS table. |
| p-NR-FR1<br>The maximum total transmit power to be used by the UE in this NR cell group across all serving cells in frequency range 1 (FR1). The maximum transmit power that the UE may use may be additionally limited by p-Max (configured in FrequencyInfoUL) and by p-UE-FR1 (configured total for all serving cells operationg on FR1). |
| p-UE-FR1<br>The maximum total transmit power to be used by the UE across all serving cells in frequency range 1 (FR1) across all cell groups. The maximum transmit power that the UE may use may be additionally limited by p-Max (configured in FrequencyInfoUL) and by p-NR-FR1 (configured for the cell group). |
| powerBoostPi2BPSK<br>If this field is set to enabled, when pi/2 BPSK is used, the maximum total transmit power to be used by the UE in this NR cell group across all serving cells in frequency range 1 (FR1) is set to the value indicated by p-NR-FR1 in *PhysicalCellGroupConfig* IE plus 3dB, according to TS 38.101 (Section X.Y.Z). The maximum transmit power that the UE may use may be additionally limited by p-Max (configured in FrequencyInfoUL) and by p-UE-FR1 (configured total for all serving cells operationg on FR1). |

FIG.11C

*(PhysicalCellGroupConfig field descriptions (continued))*

| |
|---|
| *pdsch-HARQ-ACK-Codebook*<br>The PDSCH HARQ-ACK codebook is either semi-static or dynamic. This is applicable to both CA and none CA operation.<br>Corresponds to L1 parameter 'HARQ-ACK-codebook' (see 38.213, section FFS_Section) |
| *sp-CSI-RNTI*<br>RNTI for Semi-Persistent CSI reporting on PUSCH (see CSI-ReportConfig). Corresponds to L1 parameter 'SPCSI-RNTI' (see 38.214, section 5.2.1.5.2) |
| *tpc-PUCCH-RNTI*<br>RNTI used for PUCCH TPC commands on DCI. Corresponds to L1 parameter 'TPC-PUCCH-RNTI' (see 38.213, section 10). |
| *tpc-PUSCH-RNTI*<br>RNTI used for PUSCH TPC commands on DCI. Corresponds to L1 parameter 'TPC-PUSCH-RNTI' (see 38.213, section 10) |
| *tpc-SRS-RNTI*<br>RNTI used for SRS TPC commands on DCI. Corresponds to L1 parameter 'TPC-SRS-RNTI' (see 38.213, section 10) |

FIG.12A

6.2B.4.1.3  Inter-band EN-DC within FR1

For inter-band dual connectivity with one uplink serving cell per CG on E-UTRA and NR respectively, the UE is allowed to set its configured maximum output power $P_{CMAX,c(i),i}$ for serving cell $c(i)$ of CG $i$, $i = 1,2$, and its total configured maximum output power $P_{CMAX}$.

The configured maximum output power $P_{CMAX\_E-UTRA,c}(p)$ in sub-frame $p$ for the configured E-UTRA uplink carrier shall be set within the bounds:

$P_{CMAX\_L\_E-UTRA,c}(p) \leq P_{CMAX\_E-UTRA,c}(p) \leq P_{CMAX\_H\_E-UTRA,c}(p)$ where $P_{CMAX\_L\_E-UTRA,c}$ and $P_{CMAX\_H\_E-UTRA,c}$ are the limits for a serving cell $c$ as specified in 36.101 sub-clause 6.2.5 modified by $P_{LTE}$ as follows:

$P_{CMAX\_L\_E-UTRA,c} = MIN \{MIN(P_{EMAX,c}, P_{LTE}) - \Delta t_{C\_E-UTRA,c'} (P_{PowerClass} - \Delta P_{PowerClass}) - MAX(MPR_c + A - MPR_c + \Delta T_{IB,c} + \Delta T_{C\_E-UTRA,c} + \Delta T_{ProSe'} P-MPR_c)\}$ $P_{CMAX\_H\_E-UTRA,c} = MIN \{P_{EMAX,c'} P_{LTE'} P_{PowerClass} - \Delta P_{PowerClass}\}$

FIG.12B

The configured maximum output power $P_{CMAX\_NR,c}(q)$ in slot $q$ for the configured NR carrier shall be set within the bounds:

$P_{CMAX\_L\_NR,c}(q) \leq P_{CMAX\_NR,c}(q) \leq P_{CMAX\_H\_NR,c}(q)$ where $P_{CMAX\_L\_NR,c}$ and $P_{CMAX\_H\_NR,c}$ are the limits for a serving cell c as specified in sub-clause 6.2.4 of 38.101-1 modified by $P_{NR}$ as follows:

$P_{CMAX\_L\_NR,c} = MIN \{MIN(P_{EMAX,c}, P_{NR}) - \Delta T_{C\_NR,c}, (P_{PowerClass} - \Delta P_{PowerClass}) - MAX(MPR_c + A-MPR_c + \Delta T_{IB,c} + \Delta T_{C\_NR,c} + \Delta T_{RxSRS}, P-MPR_c)\}$ $P_{CMAX\_H\_NR,c} = MIN \{P_{EMAX,c}, P_{NR}, P_{PowerClass} - \Delta P_{PowerClass}\}$ $P_{LTE}$ and $P_{NR}$ are the linear values for the $P_{LTE}$ and $P_{NR}$ respectively signaled by RRC defined in [7]

$\Delta T_{C\_E-UTRA,c} = 1.5dB$ when NOTE 2 in Table 6.2.2-1 in 36.101 applies for a serving cell c, otherwise $\Delta T_{C\_E-UTRA,c} = 0dB$;

$\Delta T_{C\_NR,c} = 1.5dB$ when NOTE 3 in Table 6.2.1-1 in 38.101-1 applies for a serving cell c, otherwise $\Delta T_{C\_NR,c} = 0dB$;

$\Delta T_{IB,c}$ specified in sub-clause 6.2.7 for EN-DC, the individual Power Class defined in table 6.2B.1-3 and any other additional power reductions parameters specified in sub-clauses 6.2.3 and 6.2.4 for EN-DC are applicable to $P_{CMAX\_E-UTRA,c}$ and $P_{CMAX\_NR,c}$ evaluations.

When the IE powerBoostPi2BPSK is set to 1, $P_{NR}$ is increased by +3 dB for a power class 3 capable UE operating in TDD bands n40, n77, n78, and n79 with PI/2 BPSK modulation and 40% or less slots in radio frame are used for UL ransmission when PEMAX,c ≥ 20 dBm.

When the IE powerBoostPi2BPSK is set to 1, $\Delta P_{PowerClass} = -3$ dB for a power class 3 capable UE operating in TDD bands n40, n77, n78, and n79 with PI/2 BPSK modulation and 40% or less slots in radio frame are used for UL transmission.

FIG.12C

If the transmissions from NR and E-UTRA do not overlap, then the complete sub-clauses for configured transmitted power for E-UTRA and NR respectively from their own specifications apply with the modifications specified above. The lower value between $P_{PowerClass, EN-DC}$ or $P_{EMAX, EN-DC}$ shall not be exceeded at any time by UE.

If the EN-DC UE is not supporting dynamic power sharing, then the complete sub-clauses for configured transmitted power for E-UTRA and NR respectively from their own specifications 36.101 and 38.101-1 respectively apply with the modifications specified above. The lower value between $P_{PowerClass, EN-DC}$ or $P_{EMAX, EN-DC}$ shall not be exceeded at any time by UE.

When a UE supporting dynamic sharing is configured for overlapping E-UTRA uplink and NR uplink transmissions, the UE can set its configured maximum output power $P_{CMAX, E-UTRA,c}$ and $P_{CMAX, NR,c}$ for the configured E-UTRA and NR uplink carriers, respectively, as specified above and its total configured maximum output power $P_{CMAX}$.

USER EQUIPMENT AND TRANSMISSION POWER CONTROL METHOD

TECHNICAL FIELD

The present invention relates to a user equipment and a transmission power control method in a wireless communication system.

BACKGROUND ART

In the 3GPP (3rd Generation Partnership Project), a wireless communication method called 5G or NR (New Radio) (hereinafter, the wireless communication method will be referred to as "5G" or "NR") has been studied in order to further increase a capacity of the system, further increase a data transmission speed, and further reduce a delay in a wireless communication area, and the like. For 5G, various wireless technologies have been studied so that 5G satisfies the requirement that the delay in the wireless communication area is 1 ms or less while achieving throughput of 10 Gbps or more.

In 3GPP, a plurality of power classes (PC) having different maximum transmission powers are introduced. As illustrated in FIG. 1, the power class with a maximum transmission power of 23 dBm is defined as power class 3 (PC3). In addition to PC3, there is a power class 2 (PC2) having a maximum transmission power of 26 dBm (See, for example, Non-patent Document 1). In Japan, user equipments are required to have signal transmission powers of 23 dBm or less, regardless of modulation methods, for legal regulations.

PRIOR ART DOCUMENT

Non-Patent Documents

Non-patent Document 1: 3GPP TS 38.101-1 V15.2.0 (2018-06)
Non-patent Document 2: 3GPP TS 36.304 V15.0.0 (2018-06)

SUMMARY OF THE INVENTION

Problem to be Solved by the Invention

Conventionally, a predetermined maximum transmission power has been assigned to a predetermined power class, and the maximum transmission power could not be changed according to a modulation method.

The present invention has been made in view of the foregoing, and aims at extending a power class of a user equipment in a wireless communication system to allow a different maximum transmission power according to a predetermined condition, for example, a specified modulation method.

Means for Solving Problems

According to an aspect of the present disclosure, a user equipment including a transmission unit configured to transmit a signal; and a control unit configured to determine, according to a power class, a maximum transmission power for transmitting the signal is provided. The control unit adjusts, according to an instruction from a base station apparatus, the maximum transmission power, and the instruction includes information validating or invalidating adjustment of the maximum transmission power.

Effect of Invention

According to an aspect of the present disclosure, in a wireless communication system, a power class of a user equipment can be extended to allow a different maximum transmission power according to a predetermined condition, for example, a specified modulation method.

BRIEF DESCRIPTION OF THE DRAWINGS

FIG. 1 is a diagram for explaining a plurality of power classes having different maximum transmission powers.
FIG. 5 is a diagram depicting an example of an extended power class 3.
FIG. 6 is a diagram illustrating a formula for calculating a maximum transmission power allowed for a user equipment.
FIG. 7 is a diagram illustrating a formula of a rule of cell selection (Srxlev) during an idle time of the user equipment.
FIG. 8 is a diagram illustrating a formula for calculating a maximum transmission power that the user equipment is allowed to transmit.
FIG. 9A is a diagram depicting an example, in which a rule for increasing the maximum transmission power for the user equipment is applied only to a serving cell where the user equipment is located.
FIG. 9B is a diagram depicting another example, in which the rule for increasing the maximum transmission power for the user equipment is applied only to a serving cell where the user equipment is located.
FIG. 10A is a diagram depicting an example, in which the rule for increasing the maximum transmission power for the user equipment is applied only to a serving cell where the user equipment is located.
FIG. 10B is a diagram depicting another example, in which the rule for increasing the maximum transmission power for the user equipment is applied only to a serving cell where the user equipment is located.
FIG. 10C is a diagram depicting still another example, in which the rule for increasing the maximum transmission power for the user equipment is applied only to a serving cell where the user equipment is located.
FIG. 10D is a diagram depicting yet another example, in which the rule for increasing the maximum transmission power for the user equipment is applied only to a serving cell where the user equipment is located.
FIG. 10E is a diagram depicting still another example, in which the rule for increasing the maximum transmission power for the user equipment is applied only to a serving cell where the user equipment is located.
FIG. 10F is a diagram depicting yet another example, in which the rule for increasing the maximum transmission power for the user equipment is applied only to a serving cell where the user equipment is located.
FIG. 11A is a diagram depicting an example, in which the rule for increasing the maximum transmission power for the user equipment is applied to all serving cells belonging to a cell group.

FIG. 11B is a diagram depicting another example, in which the rule for increasing the maximum transmission power for the user equipment is applied to all serving cells belonging to the cell group.

FIG. 11C is a diagram depicting yet another example, in which the rule for increasing the maximum transmission power for the user equipment is applied to all serving cells belonging to the cell group.

FIG. 12A is a diagram depicting an example, in which the rule for increasing the maximum transmission power for the user equipment is applied to all serving cells belonging to the cell group.

FIG. 12B is a diagram depicting another example, in which the rule for increasing the maximum transmission power for the user equipment is applied to all serving cells belonging to the cell group.

FIG. 12C is a diagram depicting yet another example, in which the rule for increasing the maximum transmission power for the user equipment is applied to all serving cells belonging to the cell group.

MODES FOR CARRYING OUT THE INVENTION

Hereinafter, embodiments of the present disclosure will be described with reference to the drawings. Note that embodiments described below are exemplary, and embodiments to which the present disclosure applies are not limited to the following embodiments.

Figure 2:
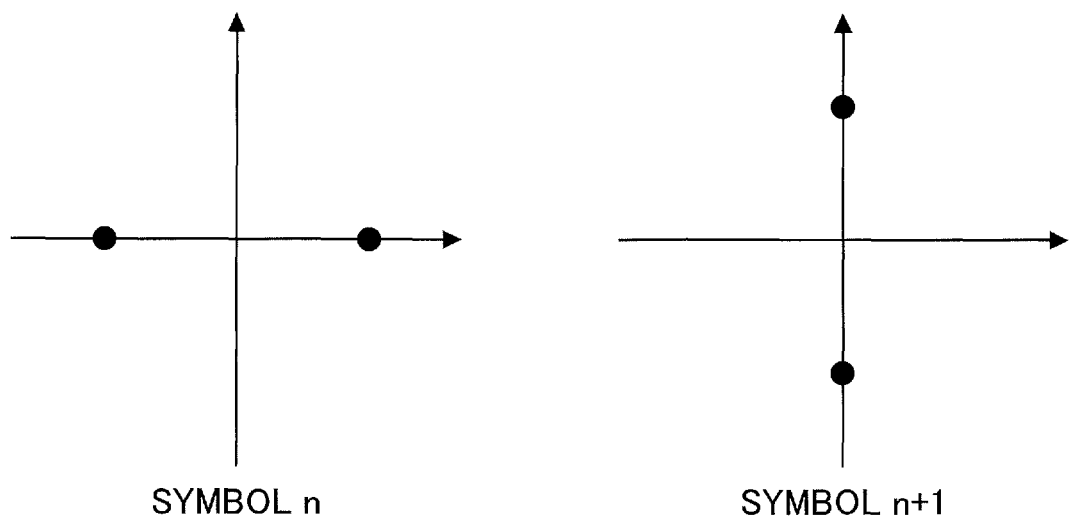
FIG. 2 is a diagram for explaining a Pi/2 BPSK.

In the NR of Release 15, Pi/2 BPSK has been introduced as an uplink modulation method. As shown in FIG. 2, in Pi/2 BPSK, an amplitude variation of a transmission signal does not pass through the origin by rotating a phase 90 degrees per symbol. By using Pi/2 BPSK, the power amplifier can be operated near a power saturation point. Thus, power efficiency is enhanced.

In the 3GPP, further enhancement of the power efficiency and a reduction of a PAPR (Peak-to-Average Power Ratio) have been studied by applying frequency filters to Pi/2 BPSK. Pi/2 BPSK to which the frequency filter is applied, is called Pi/2 BPSK with spectrum shaping, and is distinguished, in the standardization, from Pi/2 BPSK without spectrum shaping, to which a frequency filter is not applied.

Figure 3:
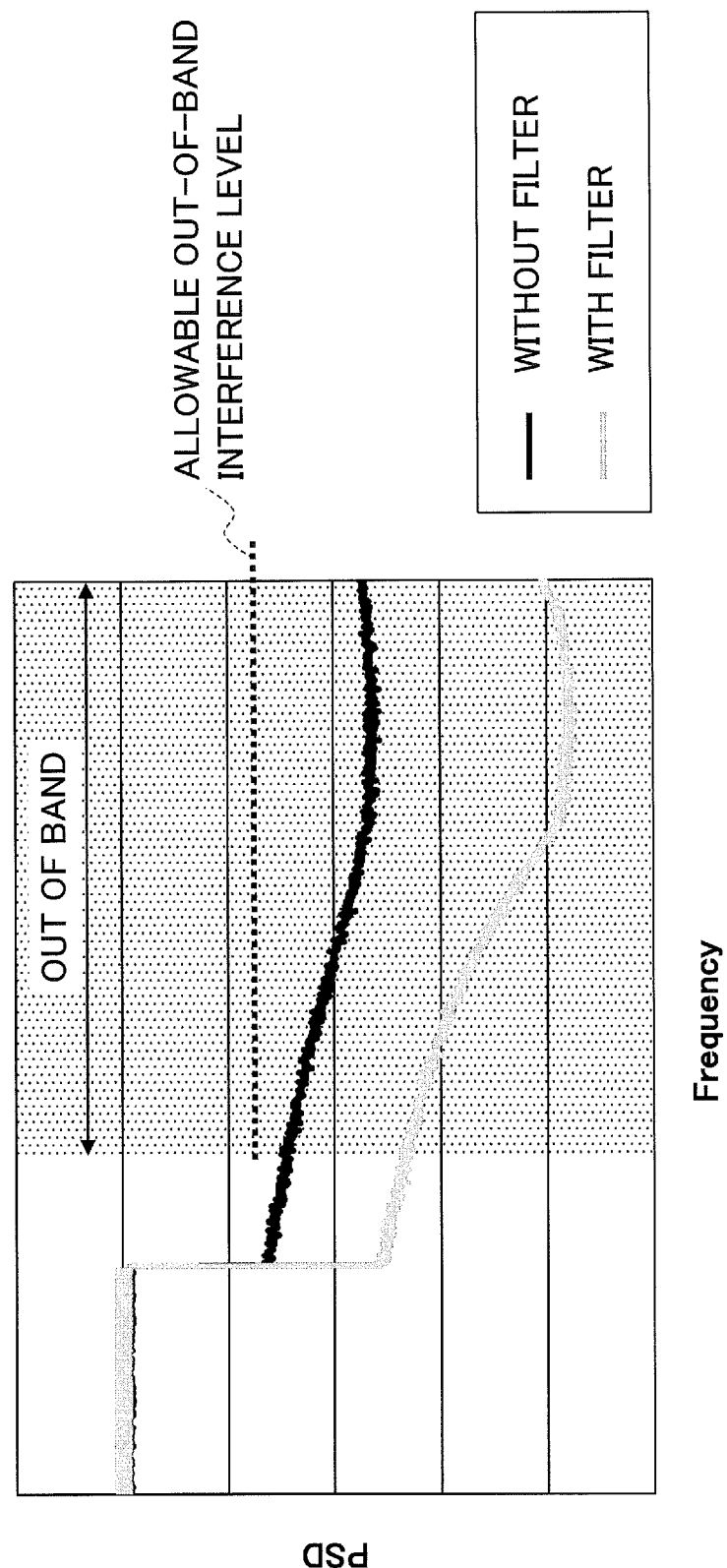
FIG. 3 is a diagram for explaining a Pi/2 BPSK with spectrum shaping.

It is known that because the PAPR can be reduced in Pi/2 BPSK with spectrum shaping, the transmission signal distortion arising from a non-linear region of the power amplifier can be reduced, and an out-of-band interference can be reduced as shown in FIG. 3. Thus, when Pi/2 BPSK with spectrum shaping is applied, the maximum transmission power of the user equipment can be increased (e.g. 3 dBm) while satisfying a desired out-of-band interference level.

If the maximum transmission power of the user equipment can be increased, an increase of coverage can be expected. However, the maximum transmission powers are often regulated by laws and regulations depending on countries or regions.

Accordingly, when Pi/2 BPSK with spectrum shaping is applied, it is desirable that the maximum transmission power of the user equipment can be flexibly set, in accordance with a status of each country's laws and regulations. As described above, in the present status of laws and regulations in Japan, transmission power greater than 23 dBm is not allowed regardless of the modulation method. Moreover, in the present technical specification documentation of NR and LTE, it is not possible to change the maximum transmission power, depending on the modulation method.

Moreover, depending on whether Pi/2 BPSK with spectrum shaping is used, the coverage varies. Thus, it is desirable that a cell selection method of the user equipment can be flexibly set depending on whether Pi/2 BPSK with spectrum shaping is used.

Figure 4:
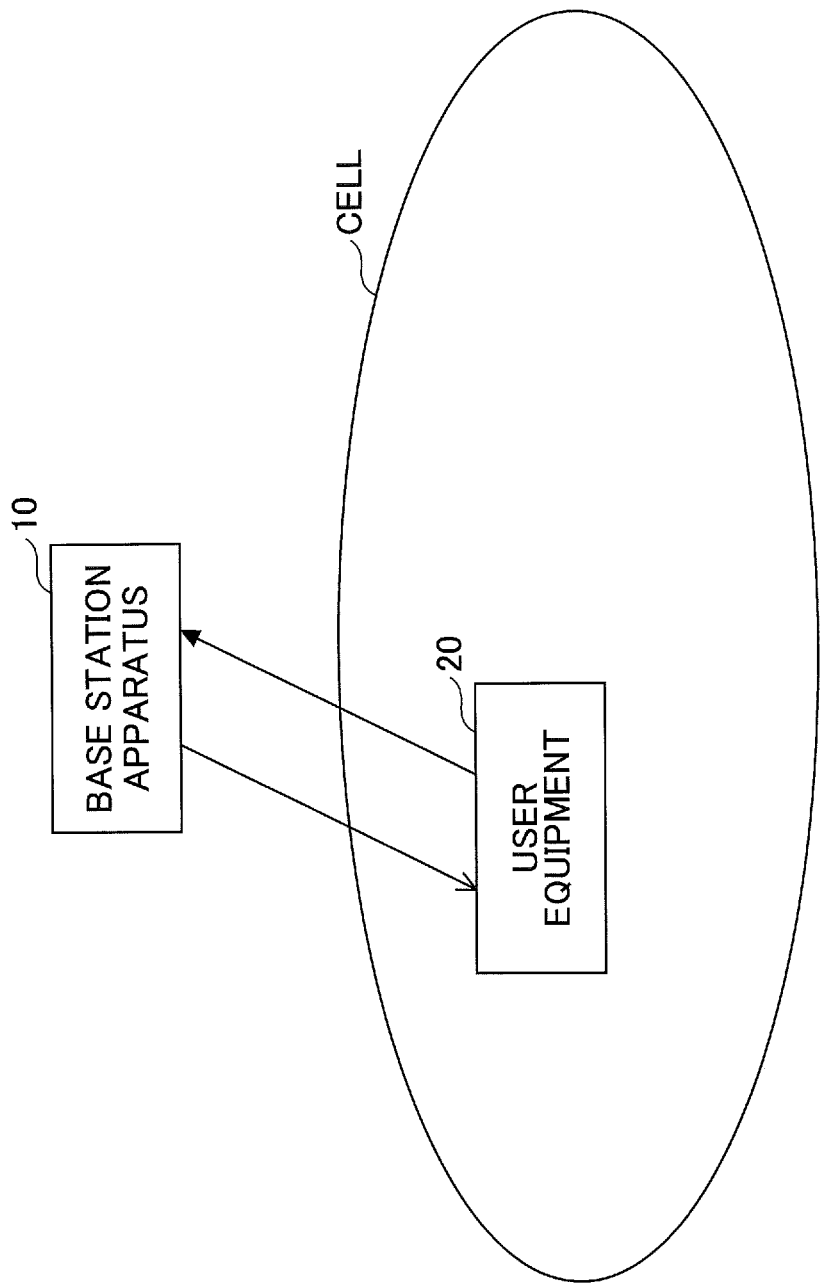
FIG. 4 is a diagram for explaining a wireless communication system according to an embodiment of the present disclosure.

FIG. 4 is a diagram for explaining a wireless communication system according to the embodiment of the present disclosure. As shown in FIG. 4, the wireless communication system in the embodiments of the present disclosure includes a base station apparatus 10 and a user equipment 20.

The base station apparatus 10 communicates with the user equipment 20 via a wireless bearer established between the base station apparatus 10 and the user equipment 20. The base station apparatus 10 may be referred to as an "eNB (enhanced NodeB)", an "NR (New Radio) node", a "gNB (Next generation NodeB)", or the like.

The user equipment 20 is a terminal that frequently transmits and receives large amounts of data (MBB (Mobile Broad Band) terminal), such as a smartphone, or a terminal that transmits and receives small amounts of data at a low frequency (MTC (Machine Type Communication) terminal), such as an IoT device. In the embodiment of the present disclosure, the user equipment 20 includes any type (UE category) of user equipment 20.

The following shows a method for enabling the power class of the user equipment 20 to be expanded in the wireless communication system, to allow different maximum transmission power depending on the specified modulation method.

(Method 1)

FIG. 5 is an example of the extended power class 3. The power class as shown in FIG. 5 is defined as a method 1 that expands the power class of the user equipment 20, to allow different maximum transmission power depending on the specified modulation method.

As shown in FIG. 5, in the extended power class 3, when Pi/2 BPSK with spectral shaping is set as the modulation method, the maximum transmission power is 26 dBm, and when a method with the exception of Pi/2 BPSK with spectral shaping is set as the modulation method, the maximum transmission power is 23 dBm.

The user equipment 20 reports the power class to a network (NW), i.e. the base station apparatus 10, as a UE capability, as well as the existing LTE or NR. The numerical values shown in FIG. 5 are exemplary and may be different values. In addition, the "with spectrum shaping" in Pi/2 BPSK with spectrum shaping may be omitted. That is, the modulation method may be Pi/2 BPSK. Moreover, Pi/2 BPSK is exemplary, and a predetermined maximum transmission power may be specified for a predetermined modulation method with the exception of Pi/2 BPSK. Moreover, in addition to the modulation method, a predetermined maximum transmission power may be specified for a predetermined number of MIMO (Multiple-Input and Multiple-Output) layers.

(Method 2)

As a method 2 that expands the power class of the user equipment 20, and enables different maximum transmission power, according to the specified modulation method, the user equipment may transmit a signal using transmission power that is different from the existing power class, only when the network NW issues an instruction. If the network NW does not issue an instruction, transmission with power that exceeds the transmission power of the existing power class (e.g. 23 dBm) is not allowed, regardless of the modulation method.

(Method 2-1)

As the first instruction method (Method 2-1) from the network NW of Method 2, the network NW may instruct the maximum transmission power to the user equipment 20. Means for instruction includes broadcasting, an RRC, a dynamic signaling, a combination thereof, or the like. Candidate values may be set in advance by broadcasting or the RRC signaling, and the maximum transmission power may be dynamically set by the dynamic signaling.

(Method 2-2)

As the second instruction method (Method 2-2) from the network NW of Method 2, information may be transmitted from the network NW to the user equipment 20 that a signal may be transmitted at a transmission power exceeding 23 dBm, for example. The information that a signal may be transmitted at a transmission power exceeding 23 dBm can be transmitted, for example, as information of one bit. Means for transmitting information that a signal may be transmitted at a transmission power exceeding 23 dBm includes broadcasting, an RRC, a dynamic signaling, or the like. In addition, information that the maximum transmission power is reduced may be transmitted under a predetermined condition. For example, the information is to reduce the maximum transmission power from 23 dBm to 20 dBm according to the set modulation method or the number of MIMO layers.

Method 1, Method 2, Method 2-1, and Method 2-2 may be used alone or in any suitable combination.

(Supplement to Limitation of Maximum Transmission Power)

FIG. 6 illustrates an equation for calculating the maximum transmission power allowable to be transmitted by the user equipment 20 (See Non-Patent Document 1, Section 6.2.4).

In NR or LTE, $P_{EMAX,c}$ is signaled from the network NW to the user equipment 20 (SIB (System Information Block)). When the $P_{EMAX,c}$ is signaled from the network NW (Method 2-1), the user equipment 20 calculates the maximum transmission power ($P_{CMSX\_H,f,c}$) using the equation shown in FIG. 6. If $P_{EMAX,c}$ is not signaled from the network NW, the terms of $P_{EMAX,c}$ in the equation shown in FIG. 6 are typically ignored.

For example, the described Method 1 can be realized by setting $P_{PowerClass}$ in the formula shown in FIGS. 6 to 26 dBm (for PC3) only when the modulation method is Pi/2 BPSK with spectrum shaping. Alternatively, in the equation shown in FIG. 6, $\Delta P_{PowerClass}$ may be set to −3 dBm (for PC3) only when the modulation method is Pi/2 BPSK with spectrum shaping.

Note that in the described embodiment, the maximum transmission power is specified to be increased only in some modulation methods. However, the maximum transmission power may be specified to be lowered only in some modulation methods.

Moreover, in the described embodiment, the maximum transmission power for some modulation methods is specified to be increased for the power class 2 (maximum 23 dBm) with a low maximum transmission power. However, an A-MPR (Additional allowed Maximum Power Reduction), which reduces the transmission power for some modulation methods for the power class 2 (maximum 26 dBm), may be specified. For example, the A-MPR of +3 dBm may be specified for modulation methods with the exception of Pi/2 BPSK.

(Setting of Appropriate Cell Coverage (Selection of Cells))

As described above, if the maximum transmission power of the user equipment 20 can be increased, an increase in coverage can be expected.

FIG. 7 is an expression illustrating a rule of cell selection (Srxlev) during an idle time of the user equipment 20. The following shows setting methods for setting an appropriate cell coverage when the maximum transmission power of the user equipment 20 can be increased.

(Setting Method 1)

In the equation shown in FIG. 7, Srxlev may be directly offset by 3 dB, as a setting method 1 for setting the appropriate cell coverage when the maximum transmission power of the user equipment 20 can be increased.

(Setting Method 2)

In the equation shown in FIG. 7, $Q_{rxlevmin}$ may be offset by 3 dB, as a setting method 2 for setting the appropriate cell coverage when the maximum transmission power of the user equipment 20 can be increased.

(Setting Method 3)

In the equation shown in FIG. 7, $Q_{rxlevminoffset}$ may be offset by 3 dB, as a setting method 3 for setting the appropriate coverage when the maximum transmission power of the user equipment can be increased.

(Setting Method 4)

In the equation shown in FIG. 7, Pcompensation may be offset by 3 dB, as a setting method 4 for setting the appropriate coverage when the maximum transmission power of the user equipment can be increased.

(Setting Method 5)

In the equation shown in FIG. 7, $Qoffset_{temp}$ may be offset by 3 dB, as a setting method 5 for setting the appropriate coverage when the maximum transmission power of the user equipment can be increased.

It may be determined whether or not the above setting method is applied in accordance with the signaling (instruction from the network NW) in Method 2.

In the case of Method 2-1, the above setting method may be applied only when a value greater than 23 dBm is signaled.

In the case of Method 2-2, the above setting method may be applied only when a signal is signaled to be transmitted at a transmission power greater than 23 dBm.

(Specific Specifications)

As shown in Method 2-2 above, the network NW may transmit 1-bit information to the user equipment 20 that a signal may be transmitted with a transmission power exceeding 23 dBm. A specific example of a specification that specifies to transmit one-bit information, in which a signal may be transmitted from the network NW to the user equipment 20 at a transmission power exceeding 23 dBm, will be shown below.

Specific Example 1

FIG. 8 shows an expression ($P_{CMAX\_H,f,c}$=MIN {$P_{EMAX, c}$, $P_{PowerClass}-\Delta P_{PowerClass}$}) that calculates the maximum transmission power ($P_{CMAX\_H,f,c}$) that the user equipment 20 is allowed to transmit. As shown in FIG. 8, it is specified that when [P-Boost-BPSK] is set to 1, 3 dB is added to $P_{EMAX,\ c}$ for UE of the power class of 3 and the modulation method of Pi/2 BPSK. Moreover, it is specified that when [P-Boost-BPSK] is set to 1, −3 dB is substituted for $\Delta P_{PowerClass}$ for the UE of the power class of 3 and the modulation method of Pi/2 BPSK. Thus, by introducing a 1-bit RRC signaling called [P-Boost-BPSK], the maximum transmission power of the UE of the modulation method of Pi/2 BPSK can be boosted. FIGS. 9A-9B and 10A-10F are diagrams illustrating examples in which a rule for increasing the maximum transmission power of a user equipment is applied only to a serving cell where the user equipment is located.

FIGS. 9A-9B show an information element "Frequency InfoUL" that provides basic parameters of an upstream link carrier. A parameter "p-Max" included in the information element "FrequenyInfoUL" represents the maximum transmission power allowed for the user equipment 20 in the serving cell.

FIGS. 10A-10F show the information element "Serving-CellConfig" used in setting the user equipment 20 for the serving cell. As shown in FIGS. 10A-10F, if a field "powerBoostPi2BPSK" included in the information element "ServingCellConfig" is set to "enabled" and the Pi/2 BPSK modulation method is used, the maximum transmission power allowed for the user equipment 20 in the serving cell is set to a value obtained by adding 3 dB to the value of "p-Max" in the information element "FrequenyInfoUL". The field "PowerBoostPi2BPSK" in FIGS. 10A-10F corresponds to [P-Boost-BPSK] in FIG. 8.

Specific Example 2

In Specific Example 1, examples, in which the rule for increasing the maximum transmission power of the user equipment was applied only to a serving cell where the user equipment 20 is located, were shown. In Specific Example 2, illustrated in FIGS. 11A-11C and 12A-12C, examples, in which the rule for increasing the maximum transmission power of the user equipment is applied to all serving cells belonging to cell group, will be shown.

FIGS. 11A-11C show an information element "PhysicalCellGroupConfig" used to configure cell groups. A parameter "p-NR-FR1" included in the information element "PhysicalCellGroupConfig" represents the maximum transmission power allowed for the user equipment 20 in all serving cells of the cell group. Moreover, the information element "PhysicalCellGroupConfig" also includes a field "powerBoostPi2BPSK". As shown in FIGS. 11A-11C, if the field "powerBoostPi2BPSK" is set to "enabled" and the Pi/2 BPSK modulation method is used, the maximum transmission power allowed for the user equipment 20 in all serving cells of the cell group is set to a value obtained by adding 3 dB to a value of the parameter "p-NR-FR1".

FIGS. 12A-12C show an expression ($P_{CMAX\_H\_NR,\ c}=MIN\{P_{EMAX,\ c},\ P_{NR},\ P_{PowerClass}-\Delta P_{PowerClass}\}$) that calculates the maximum transmission power ($P_{CMAX\_H\_NR,\ c}$) of the user equipment 20 in the NR of EN-DC (E-UTRA-NR Dual Connectivity). As shown in FIGS. 12A-12C, it is specified that when the powerBoostPi2BPSK is set to 1, 3 dB is added to $P_{NR}$ for the UE of the power class of 3 and the modulation method is Pi/2 BPSK, and that when the powerBoostPi2BPSK is set to 1, −3 dB is substituted for $\Delta P_{PowerClass}$ for the UE of the power class of 3 and the modulation method of Pi/2 BPSK.

Note that "$P_{NR}$" in FIGS. 12A-12C corresponds to "p-NR-FR1" in FIGS. 11A-11C.

(Equipment Configuration)

Next, a functional configuration example of the base station apparatus 10 and the user equipment 20 that perform the processes and operations described above will be described. The base station apparatus 10 and the user equipment 20 include functions of implementing the embodiments described above. However, each of the base station apparatuses 10 and the user equipment 20 may include only a part of the functions in the embodiments.

<Base Station Apparatus 10>

Figure 13:
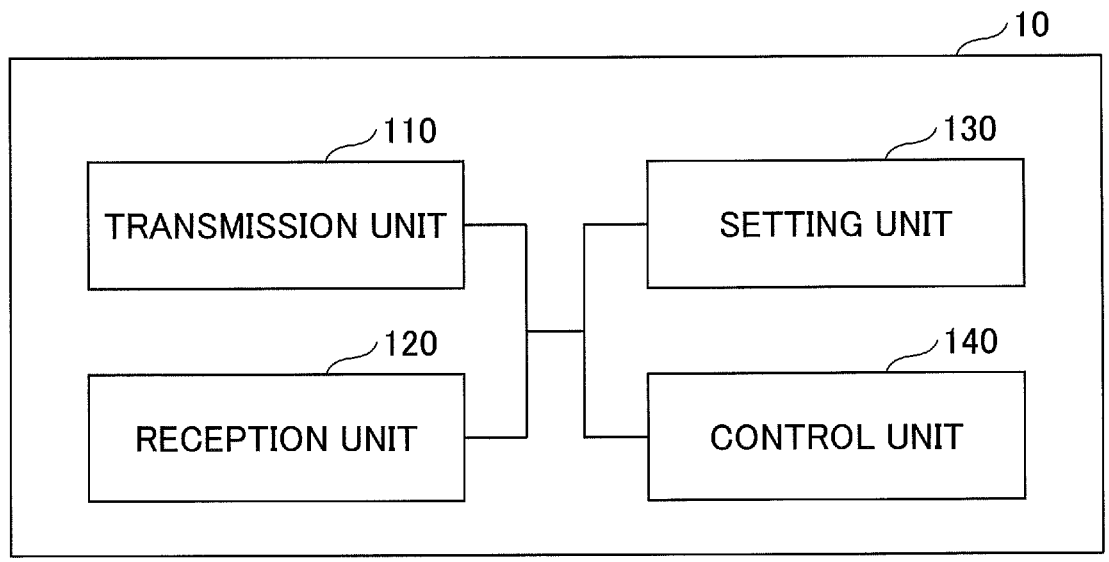
FIG. 13 is a diagram depicting an example of a functional configuration of a base station apparatus 10 according to the embodiment of the present disclosure.

FIG. 13 is a diagram illustrating an example of a functional configuration of the base station apparatus 10. As shown in FIG. 13, the base station apparatus 10 includes a transmission unit 110, a reception unit 120, a setting unit 130, and a control unit 140. The functional configuration shown in FIG. 13 is merely an example. As long as the operations according to the embodiments of the present disclosure can be performed, any name may be assigned to the functional category and the functional part.

The transmission unit 110 includes a function of generating a signal to be transmitted to the user equipment 20 and transmitting the signal wirelessly. The reception unit 120 includes a function of receiving various signals transmitted from the user equipment 20 and acquiring information of a higher layer, for example, from the received signal. The transmission unit 110 transmits (instructs) the maximum transmission power to the user equipment 20 using the broadcasting, the RRC, the Dynamic signaling, or the like. Alternatively, the transmission unit 110 transmits information to the user equipment 20 that a signal may be transmitted at a transmission power exceeding a predetermined transmission power.

The setting unit 130 stores preset setting information and various setting information to be transmitted to the user equipment 20 in the storage device, and reads out the setting information from the storage device as necessary.

The control unit 140 instructs the user equipment 20 to transmit the maximum transmission power using the broadcasting, the RRC, the Dynamic signaling, or the like through the transmission unit 110. Alternatively, through the transmission unit 110 the control unit 140 transmits information to the user equipment 20 that a signal may be transmitted at the transmission power exceeding the predetermined transmission power. A function part for transmitting signals in the control unit 140 may be included in the transmission unit 110, and a function part for receiving signals in the control unit 140 may be included in the reception unit 120.

<User Equipment 20>

Figure 14:
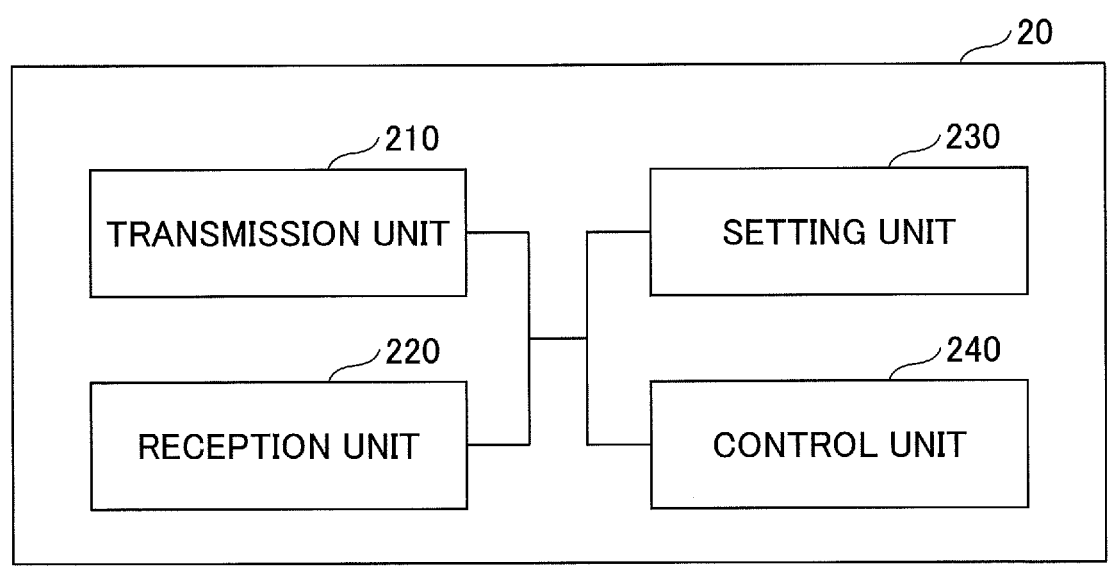
FIG. 14 is a diagram depicting an example of a functional configuration of a user equipment 20 according to the embodiment of the present disclosure.

FIG. 14 is a diagram illustrating an example of a functional configuration of the user equipment 20. As shown in FIG. 14, the user equipment 20 includes a transmission unit 210, a reception unit 220, a setting unit 230, and a control unit 240. The functional configuration shown in FIG. 14 is merely an example. As long as the operations according to the embodiments of the present disclosure can be performed, any name may be assigned to the functional category and the functional part.

The transmission unit 210 generates a transmission signal from the transmission data, and transmits the transmission signal wirelessly. The reception unit 220 receives various signals wirelessly, and acquires a higher layer signal from the received signal of physical layer.

The setting unit 230 stores various setting information, received from the base station apparatus 10 or the user equipment 20 by the reception unit 220, in the storage device, and reads out the setting information from the storage device as necessary. Moreover, the setting unit 230 also stores the preset information.

The control unit 240 controls the transmission unit 210 to transmit a signal based on the maximum transmission power according to the definition of the extended power class, as described in the embodiment. Alternatively, the control unit 240 controls the transmission unit 210 so as to transmit a signal based on the maximum transmission power following an instruction received from the base station apparatus 10.

(Hardware Configuration)

Block diagrams (FIGS. 13 and 14) used in the description of the above-described embodiment illustrates blocks of functional units. These functional blocks (components) are implemented by any combination of hardware and/or software. Moreover, the method of implementing each functional block is not particularly limited. That is, each functional block may be implemented using one device that is physically or logically coupled, or may be implemented using two or more devices that are physically or logically separated and are connected directly or indirectly (e.g. using wires, wireless, etc.). Functional blocks may be implemented in combination with software in one or more of the above-described devices.

Functions include judgment, determination, decision, computing, calculation, processing, derivation, investigation, discovery, confirmation, reception, transmission, output, access, resolution, selection, establishment, comparison, assumption, expectation, deeming, broadcasting, notifying, communicating, forwarding, configuring, reconfiguring, allocating, mapping, and assigning, but are not limited to them. For example, a functional block (component) that causes "transmission" to function is called a transmission unit or a transmitter. A method of implementing any of the functions is not particularly limited, as described above.

Figure 15:
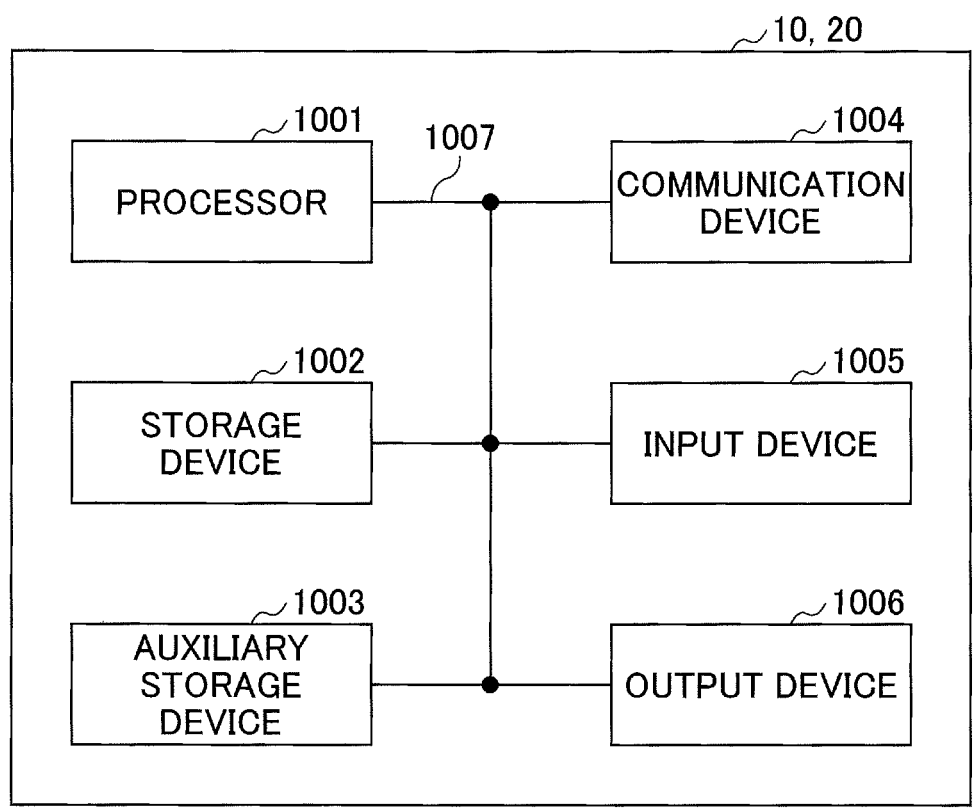
FIG. 15 is a diagram depicting an example of a hardware configuration of the base station apparatus 10 or the user equipment 20 according to the embodiment of the present disclosure.

For example, the base station apparatus 10, the user equipment 20, or the like in one embodiment of the present disclosure may function as a computer that performs processing in accordance with embodiments of the present disclosure. FIG. 15 is a diagram illustrating an example of a hardware configuration of the base station apparatus 10 and the user equipment 20 according to an embodiment of the present disclosure. The base station apparatus and the user equipment 20 described above may be physically configured as a computer device including a processor 1001, a storage device 1002, an auxiliary storage device 1003, a communication device 1004, an input device 1005, an output device 1006, a bus 1007, and the like.

Note that in the following description, the term "device" can be read as a circuit, a device, a unit, or the like. The hardware configuration of the base station apparatus 10 and the user equipment 20 may be configured to include one or more of the devices indicated by 1001-1006 in the drawings, or may be configured without some devices.

Each function in the base station apparatus 10 and the user equipment 20 is achieved by having the processor 1001 read a predetermined software (program) on hardware such as the storage device 1002, to perform the operation by the processor 1001, to control communication by the communication device 1004 or to control at least one of reading and writing data in the storage device 1002 and the auxiliary storage device 1003.

The processor 1001, for example, operates an operating system to control the entire computer. The processor 1001 may include a central processing unit (CPU) including interfaces with peripheral devices, control devices, computing devices, registers, and the like.

Moreover, the processor 1001 reads programs (program codes), software modules, data, and the like from at least one of the auxiliary storage device 1003 and the communication device 1004 to the storage device 1002, and performs various processing in accordance therewith. For the program, a program that causes a computer to execute at least a portion of the operation described in the above-described embodiments is used. For example, the transmission unit 110, the reception unit 120, the setting unit 130, and the control unit 140 of the base station apparatus 10, illustrated in FIG. 13, may be implemented by a control program that is stored in the storage device 1002 and operates in the processor 1001. Moreover, for example, the transmission unit 210, the reception unit 220, the setting unit 230, and the control unit 240 of the user equipment 20, illustrated in FIG. 14, may be implemented by a control program that is stored in the storage device 1002 and operates in the processor 1001. While the various processes described above have been described as being executed by one processor 1001, they may be executed simultaneously or sequentially by two or more processors 1001. Processor 1001 may be implemented by one or more chips. Note that the program may be transmitted from the network via a telecommunications line.

The storage device 1002 is a computer readable storage medium. The storage device 1002 may be configured of at least one of, for example, a ROM (Read Only Memory), an EPROM (Erasable Programmable ROM), an EEPROM (Electrically Erasable Programmable ROM), or a RAM (Random Access Memory). The storage device 1002 may be referred to as a register, a cache, a main memory (main storage device), or the like. The storage device 1002 can store programs (program codes), software modules, and the like that are executable to perform the processing according to one embodiment of the present disclosure.

The auxiliary storage device 1003 is a computer readable storage medium. The auxiliary storage device 1003 may be configured of, for example, at least one of an optical disk, such as a CD-ROM (Compact Disc ROM); a hard disk drive; a flexible disk; an optical magnetic disk (e.g. a compact disk, a digital versatile disk, or a Blu-ray® disk); a smart card; a flash memory (e.g. a card, a stick, or a key drive); a Floppy® disk, a magnetic strip, or the like. The auxiliary storage device 1003 may be referred to as an auxiliary memory device. The storage medium described above may be, for example, a database, a server, or other suitable medium including at least one of the storage device 1002 and the auxiliary storage device 1003.

The communication device 1004 is hardware (transceiver device) for communicating between computers via at least one of a wired network and a wireless network. The communication device 1004 is also referred to, for example, as a network device, a network control unit, a network card, a communication module, or the like. The communication device 1004 may include a high frequency switch, a duplexer, a filter, a frequency synthesizer, or the like to achieve, for example, at least one of a Frequency Division Duplex (FDD) and a Time Division Duplex (TDD). For example, the transmission unit 110 and the reception unit 120 of the base station apparatus 10 may be implemented by the communication device 1004. Moreover, the transmission unit 210 and the reception unit 220 of the user equipment 20 may be implemented by the communication device 1004.

The input device 1005 is an input device (e.g. a keyboard, a mouse, a microphone, a switch, a button, a sensor, etc.) that receives an external input. The output device 1006 is an output device (e.g. a display, a speaker, an LED lamp, etc.)

that performs output to the outside. The input device 1005 and the output device 1006 may be integrated (e.g. a touch panel).

Moreover, respective devices, including the processor 1001 and the storage device 1002, are connected by a bus 1007 for communicating information. The bus 1007 may be configured using a single bus or may be configured using different buses between devices.

Moreover, each of the base station apparatus 10 and the user equipment 20 may be configured including hardware such as a microprocessor, a digital signal processor (DSP), an ASIC (Application Specific Integrated Circuit), a PLD (Programmable Logic Device), or a FPGA (Field Programmable Gate Array). The hardware may also implement some or all of each functional block. For example, the processor 1001 may be implemented using at least one of the hardware.

Summary of Embodiment

As described above, according to the embodiment of the present disclosure, a user equipment is provided, including a transmission unit for transmitting a signal; and a control unit for determining the maximum transmission power for transmitting the signal in accordance with a power class, wherein the control unit causes the maximum transmission power to differ according to a modulation method for the signal.

According to the above-described configuration, in the wireless communication system, the power class of the user equipment can be extended, and the maximum transmission power can be made different depending on the set modulation method.

According to the embodiment of the present disclosure, the user equipment 20 can make the maximum transmission power different, in accordance with the modulation method of the signal, only when an instruction from the base station apparatus is present.

According to the embodiment of the present disclosure, a user equipment is provided including a transmission unit for transmitting a signal; and a control unit for determining the maximum transmission power for transmitting the signal in accordance with a power class, the control unit causing the maximum transmission power to differ according to an instruction from the base station apparatus.

The "maximum transmission power" described in the present disclosure may be a maximum value of the transmission power, a nominal UE maximum transmission power, or a rated UE maximum transmission power.

Supplement to Embodiments

While the embodiments of the present invention have been described above, the disclosed invention is not limited to such embodiments, and those skilled in the art will understand various variations, modifications, alternatives, substitutions, and the like. Descriptions have been made using specific numerical examples to facilitate understanding of the invention. However, unless otherwise indicated, these values are merely examples and any suitable value may be used. Classification of the items in the above description is not essential to the present invention, and matters described in two or more items may be used in combination as necessary, or a matter described in one item may be applied (unless inconsistent) to a matter described in another item. Boundaries of functional parts or processing parts in the functional block diagram do not necessarily correspond to boundaries of physical parts. An operation of a plurality of functional parts may be physically performed on one part or the operation of one functional part may be physically performed on more than one part. For the processing procedures described in the embodiment, the order of processing may be changed as long as there is no inconsistency. For the convenience of description of the process, the base station apparatus 10 and the user equipment have been described using functional block diagrams. However, such devices may be implemented in hardware, software, or a combination thereof. Software operated by the processor in the base station apparatus 10 in accordance with embodiments of the present invention and software operated by the processor in the user equipment 20 in accordance with embodiments of the present invention may be stored in a random access memory (RAM), a flash memory, a read-only memory (ROM), an EPROM, an EEPROM, a register, a hard disk (HDD), a removable disk, a CD-ROM, a database, a server, or any other suitable storage medium, respectively.

Moreover, notification/indication of information is not limited to the forms/embodiments described in the specification, and may be performed in other ways. For example, the notification/indication of information may be implemented by physical layer signaling (e.g. DCI (Downlink Control Information), or UCI (Uplink Control Information)); upper layer signaling (e.g. RRC (Radio Resource Control) signaling, or MAC (Medium Access Control) signaling); broadcast information (MIB (Master Information Block), or SIB (System Information Block)); or other signals or combinations thereof. Moreover, the RRC signaling may be referred to as an RRC message, and may be referred to as, for example, an RRC connection setup message, or an RRC connection reconfiguration message.

Each form/embodiment described in the present disclosure may be applied to at least one of a system utilizing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or any other suitable systems; and a next generation system extended based on the systems. Moreover, a plurality of systems may also be combined and applied (e.g. a combination of at least one of LTE and LTE-A with 5G).

For the processing procedures, the sequences, the flow charts, or the like of each form/embodiment described in the specification, the order thereof may be changed as long as there is no inconsistency. For example, the methods described in the present specification present elements of various steps in an exemplary order, and are not limited to the particular order that is presented.

The particular operation described in the present specification to be performed by the base station apparatus 10 may be performed by an upper node thereof in some cases. It is apparent that in a network including one or more network nodes having the base station apparatus 10, various operations performed for communication with the user equipment may be performed by the base station apparatus 10 and/or other network nodes (e.g. MME or S-GW, but are not limited to this) with the exception of the base station apparatus 10. Although one other network node with the exception of the base station apparatus 10 is illustrated above, a combination of multiple other network nodes (e.g. MME and S-GW) may be present.

Each of the forms/embodiments described in the present specification may be used alone, in combination, or switched upon implementation.

The user equipment 20 may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station apparatus 10 may be referred to, by a person skilled in the art, as NB (NodeB), eNB (evolved NodeB), gNB, a base station, or some other suitable terms.

The term "determining" as used in this disclosure may encompass a wide variety of operations. The term "determination" may include, for example, deeming as "determining" judging, calculating, computing, processing, deriving, investigating, looking up, searching, inquiring (e.g. looking up in a table, a database or other data structures), or ascertaining. The term "determining" may include, for example, deeming as "determining" receiving (e.g. receiving information), transmitting (e.g. transmitting information), input, output, or accessing (e.g. accessing data in memory). The term "determining" may include deeming as "determining" resolving, selecting, choosing, establishing, comparing, or the like. In other words, the term "determining" may include deeming any action as "determining". Moreover, the term "determining" may be read as "assuming", "expecting", "considering", or the like.

The phrase "based on" used in the present specification does not mean "based only on", unless otherwise specified. In other words, "based" means both "based only on" and "at least based on".

As long as the terms "include", "including" and variation thereof used in the present specification or in claims, these terms are intended to be inclusive, as are the term "comprising". Furthermore, the term "or" used in the present specification or in claims is not intended to be an exclusive logical sum.

In the entirety of the present disclosure, if an article is added by translation, such as, for example, "a", "an", and "the" in English, these articles may include plural forms, unless the context clearly indicates that they are not.

As described above, the invention has been described in detail. However, it will be apparent to those skilled in the art that the invention is not limited to the embodiments described in the present specification. The present invention can be implemented as variations and modifications without departing from the spirit and scope of the invention as defined by claims. Accordingly, the description in the present specification is intended for illustrative purposes and does not have any limiting significance to the present invention.

EXPLANATION OF REFERENCE SIGNS

10 base station apparatus
110 transmission unit
120 reception unit
130 setting unit
140 control unit
20 user equipment
210 transmission unit
220 reception unit
230 setting unit
240 control unit
1001 processor
1002 storage device
1003 auxiliary store device
1004 communication device
1005 input device
1006 output device

What is claimed is:

1. A terminal comprising:
a transmitter configured to transmit a signal; and
a processor configured to determine, according to a power class, a maximum transmission power for transmitting the signal,
wherein the processor adjusts, according to an instruction from a base station, the maximum transmission power,
wherein the instruction includes information activating or deactivating adjustment of the maximum transmission power,
wherein, upon detecting that the instruction includes information activating the adjustment of the maximum transmission power, the processor is configured to adjust the maximum transmission power such that the maximum transmission power for a power class 3 operating with a Pi/2 Binary Phase Shift Keying modulation method is to be increased, and
wherein the instruction from the base station is indicated by a ServingCellConfig information element (IE) used to configure the terminal with a serving cell, and the information activating or deactivating the adjustment of the maximum transmission power is indicated by a value set to a powerBoostPi2BPSK field of the ServingCellConfig IE.

2. A base station comprising:
a receiver configured to receive a signal from a terminal; and
a transmitter configured to transmit, to the terminal that determines a maximum transmission power for transmitting the signal according to a power class, an instruction to adjust the maximum transmission power,
wherein the instruction includes information activating or deactivating adjustment of the maximum transmission power,
wherein, upon detecting that the instruction includes information activating the adjustment of the maximum transmission power, the terminal is configured to adjust the maximum transmission power such that the maximum transmission power for a power class 3 operating with a Pi/2 Binary Phase Shift Keying modulation method is to be increased, and
wherein the instruction is indicated by a ServingCellConfig information element (IE) used to configure the terminal with a serving cell, and the information activating or deactivating the adjustment of the maximum transmission power is indicated by a value set to a powerBoostPi2BPSK field of the ServingCellConfig IE.

3. A transmission power control method executed by a terminal, the method comprising:
transmitting a signal; and
determining a maximum transmission power for transmitting the signal according to a power class,
wherein the determining includes adjusting the maximum transmission power according to an instruction from a base station, wherein the instruction includes information activating or deactivating adjustment of the maximum transmission power, wherein, upon detecting that the instruction includes information activating the adjustment of the maximum transmission power, the determining adjusts the maximum transmission power such that the maximum transmission power for a power class 3 operating with a Pi/2 Binary Phase Shift Keying modulation method is to be increased, and wherein the instruction from the base station is indicated by a ServingCellConfig information element (IE) used to configure the terminal with a serving cell, and the information activating or deactivating the adjustment of the maximum transmission power is indicated by a value set to a powerBoostPi2BPSK field of the ServingCellConfig IE.

4. A transmission power control method executed by a base station for a terminal, comprising:

receiving a signal from the terminal; and transmitting, to the terminal that determines a maximum transmission power for transmitting the signal according to a power class, an instruction to adjust the maximum transmission power, wherein the instruction includes information activating or deactivating adjustment of the maximum transmission power, wherein, upon detecting that the instruction includes information activating the adjustment of the maximum transmission power, the terminal adjusts the maximum transmission power such that the maximum transmission power for a power class 3 operating with a Pi/2 Binary Phase Shift Keying modulation method is to be increased, and wherein the instruction is indicated by a ServingCellConfig information element (IE) used to configure the terminal with a serving cell, and the information activating or deactivating the adjustment of the maximum transmission power is indicated by a value set to a powerBoostPi2BPSK field of the ServingCellConfig IE.

* * * * *